United States Patent
Hohm et al.

(10) Patent No.: US 11,084,366 B2
(45) Date of Patent: Aug. 10, 2021

(54) MOUNTING ARRANGEMENT OF AN ELECTRICALLY DRIVEN MOTOR VEHICLE

(71) Applicant: Volkswagen Aktiengesellschaft, Wolfsburg (DE)

(72) Inventors: Volker Hohm, Destedt (DE); Uwe Pabst, Blankenburg (DE); Tobias Ströhlein, Braunschweig (DE); Krino Bornemann, Klein Ammensleben (DE); Helge Herten, Braunschweig (DE); Christoph Bokelmann-Grotefend, Peine (DE)

(73) Assignee: VOLKSWAGEN AKTIENGESELLSCHAFT, Wolfsburg (DE)

( * ) Notice: Subject to any disclaimer, the term of this patent is extended or adjusted under 35 U.S.C. 154(b) by 49 days.

(21) Appl. No.: 16/385,702

(22) Filed: Apr. 16, 2019

(65) Prior Publication Data

US 2019/0315217 A1    Oct. 17, 2019

(30) Foreign Application Priority Data

Apr. 17, 2018 (DE) .................. 10 2018 205 765.6

(51) Int. Cl.
*B60K 1/04* (2019.01)
*B60L 50/60* (2019.01)
(Continued)

(52) U.S. Cl.
CPC ............. *B60K 1/04* (2013.01); *B60L 50/66* (2019.02); *B62D 21/03* (2013.01); *B62D 21/157* (2013.01);
(Continued)

(58) Field of Classification Search
CPC ...... B62D 21/15; B62D 21/03; B62D 21/157; B60L 50/66; H01M 2/1077;
(Continued)

(56) References Cited

U.S. PATENT DOCUMENTS 8,833,839 B2 * 9/2014 Young .................. B62D 21/157
296/187.12
8,980,457 B2 * 3/2015 Kim ...................... H01M 2/206
429/83

(Continued)

FOREIGN PATENT DOCUMENTS

DE        4326269 C1   10/1994
DE   10 2009 006 990 A1   8/2010
(Continued)

*Primary Examiner* — Steve Clemmons
(74) *Attorney, Agent, or Firm* — Pearl Cohen Zedek Latzer Baratz LLP

(57) ABSTRACT

A mounting arrangement of an electrically drivable motor vehicle has at least one battery module housing that accommodates multiple battery cells to form a battery module. The battery module is oriented with its longitudinal extension transverse to a longitudinal extension of the motor vehicle. In addition, at least one separate load transfer element for transferring a crash load that occurs is present. The load transfer element is situated on each end-face side of the battery module housing, between a body part and an end-face side of the battery module housing. The arrangement is provided in such a way that when a crash load is introduced into the body part, a load path is formed that encompasses at least the body part facing the crash, the load transfer element facing the crash, the battery module housing, the load transfer element facing away from the crash, and the body part facing away from the crash.

14 Claims, 8 Drawing Sheets

(51) Int. Cl.
*B62D 21/03* (2006.01)
*B62D 21/15* (2006.01)
*B62D 25/20* (2006.01)
*H01M 50/20* (2021.01)

(52) U.S. Cl.
CPC ............ *B62D 25/20* (2013.01); *H01M 50/20* (2021.01); *B60K 2001/0438* (2013.01)

(58) Field of Classification Search
CPC .... H01M 2/1083; H01M 2/12; H01M 10/613; H01M 10/6555; H01M 10/6557; H01M 10/6567; B60K 1/04; B60K 2001/005; B60K 2001/0438; B60Y 2306/01
See application file for complete search history.

(56) References Cited

U.S. PATENT DOCUMENTS

| | | | |
|---|---|---|---|
| 9,505,442 B2* | 11/2016 | Wu | B60K 1/04 |
| 9,809,101 B2* | 11/2017 | Ikeda | B62D 25/2036 |
| 9,868,361 B2* | 1/2018 | Barbat | B60L 50/66 |
| 10,259,305 B2* | 4/2019 | Brausse | B62D 21/157 |
| 10,658,716 B2* | 5/2020 | Lee | H01M 2/1061 |
| 10,800,245 B2* | 10/2020 | Ranga | B62D 21/157 |
| 2012/0175177 A1 | 7/2012 | Lee et al. | |
| 2012/0328925 A1 | 12/2012 | Choo et al. | |
| 2013/0045407 A1 | 2/2013 | Le Jaouen et al. | |
| 2013/0207459 A1 | 8/2013 | Schroeder et al. | |
| 2014/0113171 A1* | 4/2014 | Schaefer | H01M 2/1077 429/120 |
| 2017/0305248 A1* | 10/2017 | Hara | B60L 50/66 |
| 2018/0108891 A1* | 4/2018 | Fees | H01M 2/1083 |
| 2018/0312199 A1* | 11/2018 | Kawase | B60K 1/04 |
| 2019/0031241 A1* | 1/2019 | Ayukawa | B60L 50/66 |
| 2019/0131602 A1* | 5/2019 | Hilfrich | H01M 2/1077 |

FOREIGN PATENT DOCUMENTS

| | | |
|---|---|---|
| DE | 10 2009 035 492 A1 | 2/2011 |
| DE | 10 2009 053 138 A1 | 5/2011 |
| DE | 10 2010 050 826 A1 | 5/2012 |
| DE | 10 2012 000 622 A1 | 7/2013 |
| DE | 10 2013 102 501 A1 | 9/2014 |
| DE | 10 2014 217 160 A1 | 3/2016 |
| DE | 10 2015 008 930 A1 | 1/2017 |
| DE | 10 2016 009 969 A1 | 2/2017 |
| EP | 1690745 A1 | 8/2006 |
| WO | WO 2017/207125 A1 | 12/2017 |

* cited by examiner

MOUNTING ARRANGEMENT OF AN ELECTRICALLY DRIVEN MOTOR VEHICLE

CROSS REFERENCE TO RELATED APPLICATION

This application claims priority from German Patent Application No. 10 2018 205 765.6, filed Apr. 17, 2018, which is incorporated herein by reference in its entirety.

FIELD OF THE INVENTION

The invention relates to a mounting arrangement of an electrically drivable motor vehicle, a battery module, and a load transfer element.

BACKGROUND OF THE INVENTION

A mounting arrangement has become known from DE 10 2009 035 492 A1. Specifically, the cited document proposes a battery module housing that is provided with two crash conduction elements that are situated between the battery cells and that protrude laterally beyond the battery cells or the cell stack formed by same, in the direction of the battery module housing. Thus, when a crash load occurs, the wall of the battery module housing is pressed against the crash conduction elements, not against the battery cells. The crash load is then conducted by the crash conduction elements to the other side of the cell stack, and at that location as well is transferred only to the battery module housing.

DE 10 2013 102 502 A1 describes a motor vehicle having a protective profile that is provided for protecting a traction battery of the motor vehicle in the event of a rear end collision. The protective profile is situated in the rear end of the motor vehicle, between the traction battery and a rear crossbeam, and is made of fiber-reinforced plastic. The protective profile is able to divide loads, even punctiform or linear loads, that arrive at the protective profile into a large-surface distributed load. Stress peaks on the traction battery may thus be reduced or eliminated.

DE 10 2014 217 160 A1 describes a battery module system for a motor vehicle. Multiple battery cells are combined into a battery module system and situated on a cooling plate. The battery cells are closed off with an adapter plate on each end-face side of the battery module system. The battery cells are held together by a band that extends circumferentially in the vertical and horizontal directions, and the adapter plates have recesses for accommodating one of the bands.

SUMMARY OF THE INVENTION

The object of the present invention is to provide an alternative mounting arrangement of an electrically drivable motor vehicle, in which a crash load that occurs is relayed in such a way that damage to battery cells is avoided.

A further object of the present invention is to provide a suitable battery module for installation in a mounting arrangement according to the invention. Lastly, a further object of the invention is to provide a suitable load transfer element for installation in such a mounting arrangement.

The above objects are achieved by a mounting arrangement as claimed, a battery module as claimed, and a load transfer element as claimed.

Advantageous embodiments and refinements of the invention are set forth in the respective dependent claims.

The invention is based, firstly, on a mounting arrangement of an electrically drivable motor vehicle, having at least one battery module housing that accommodates multiple battery cells to form a battery module. The battery module or the battery module housing is oriented with its longitudinal extension transverse, in particular at right angles, to a longitudinal extension of the motor vehicle. At least one separate load transfer element for transferring a crash load that occurs is present. For example, hybrid electric vehicles (HEV), plug-in hybrid electric vehicles (PHEV), or also purely electric vehicles, i.e., battery electric vehicles (BEV), are considered as electrically drivable motor vehicles.

The invention proposes that the load transfer element is situated on each end-face side of the battery module housing, between a body part and an end-face side of the battery module housing. The arrangement is provided in such a way that when a crash load is introduced into the body part, a load path is formed that encompasses at least the body part facing the crash, the load transfer element facing the crash, the battery module housing, the load transfer element facing away from the crash, and lastly, the body part facing away from the crash.

Thus, due to the load transfer element at the end-face sides of the battery module housing and the associated provision of a large load transfer surface, load transfer via the battery module housing itself is made possible. A continuous load transfer path from the body part facing the crash to the body part facing away from the crash is thus possible. A separate battery housing frame or battery housing that possibly spans multiple battery modules is therefore no longer absolutely necessary. Weight savings can be achieved in this way.

To easily achieve the desired load transfer path, in one refinement it is proposed that the load transfer element is supported, at least in areas, against an end-face surface of the battery module housing and fastened to the body part. The load transfer element is preferably supported directly against the end-face surface of the battery module housing. Additional installation space may thus be saved in the transverse vehicle direction (Y direction).

To optimize load transfer for a side impact, in one embodiment of the inventive concept it is proposed that the body parts are rocker panels, i.e., the side members situated between the wheel housings.

According to another embodiment of the invention, the load transfer element has a quadrilateral, in particular rectangular, contour. The load transfer element is supported, at least in areas, with an end-face surface against an end-face surface of the battery module housing, while with a side surface it contacts the battery module housing on the inside and/or outside.

Very good load transfer of a crash load from the load transfer element into the battery module housing may thus take place, and good adjustment of the load transfer element at the end-face side of the battery module housing is also possible.

To increase the flexibility and accessibility of the mounting arrangement, in another refinement it is also proposed for the load transfer element to have a frame-like contour. An access opening that may be utilized for heat-dissipating elements, for example, is thus formed within the load transfer element.

In order not to produce direct stress on the cover and the base of the battery module housing during transfer of an occurring crash load, according to another refinement it is proposed that the load transfer element is supported with its end-face surface solely, or at least predominantly, against end-face surfaces of side walls of the battery module housing. Thus, there is no, or only insignificant, support against end-face surfaces of the cover or the base of the battery module housing.

To be able to achieve optimal transfer of the operating heat generated in the battery module, at least one plate-like component having a heat transfer element is situated between the battery cells. The plate-like component on an end-face side of the battery module housing is connected to a coolant line via a heat-conducting connection. The coolant line may also dissipate the heat from other battery module housings that may be present.

Since as a result of the load transfer element a large contact surface for load transfer may be provided, and at the same time the occurrence of unsuitable stress states for the battery module housing may be reduced, the advantageous use of a battery module housing made of fiber composite plastic is made possible. The weight of the battery module housing may thus be reduced considerably.

As mentioned above, the invention also proposes a battery module that is suitable for installation in a mounting arrangement according to the invention. Such a battery module has a battery module housing that accommodates multiple battery cells. Viewed in a stacking direction of the battery cells, at least one plate-like component having a heat transfer element is situated between the battery cells. The plate-like component is oriented with a surface extension in particular parallel to the surface extension of the battery cells. It is thus possible to effectively discharge generated heat from the battery module.

This may be further optimized by extending the heat transfer element in a meandering manner over the surface area of the plate-like component.

To optimize the heat transfer, the heat transfer element is designed in the manner of a heat pipe. The basic design and operating principle of a heat pipe are well known from the general prior art, and therefore are not described in greater detail here. In any case, very effective heat dissipation of the operating heat arising in the battery module is thus possible.

Lastly, the invention also provides a load transfer element for installation in the proposed mounting arrangement. Such a load transfer element has a quadrilateral, in particular rectangular, contour with an L-shaped cross section, at least in areas. An end-face surface and a side surface protruding therefrom at a right angle are formed by the L-shaped cross section.

Good load transfer by the load transfer element and easy end-face adjustment of the load transfer element on the battery module housing are thus made possible with a simple design.

To allow increased flexibility and access to a mounting arrangement formed by the load transfer element, according to another embodiment the load transfer element has a frame-like contour.

In another refinement, degassing of the battery module may be facilitated by introducing multiple grooved depressions, at least in areas, into the side surface of the load transfer element, and which, starting from the end-face surface, extend at a right angle thereto, across the side surface.

Preferred exemplary embodiments of the invention are illustrated in the figures and explained in greater detail in the following description with reference to the figures, as the result of which even further advantages of the invention will become apparent. Identical, comparable, or functionally equivalent components are denoted by the same reference numerals, even in different figures. Corresponding or comparable properties and advantages are achieved, even when a repeated description or reference is not provided. The figures are not, at least not always, true to scale. In some figures, proportions or distances may be depicted in an exaggerated manner to allow clearer emphasis of features of an exemplary embodiment.

BRIEF DESCRIPTION OF THE DRAWINGS

In the figures, in each case schematically.

DETAILED DESCRIPTION OF THE INVENTION

Figure 1:
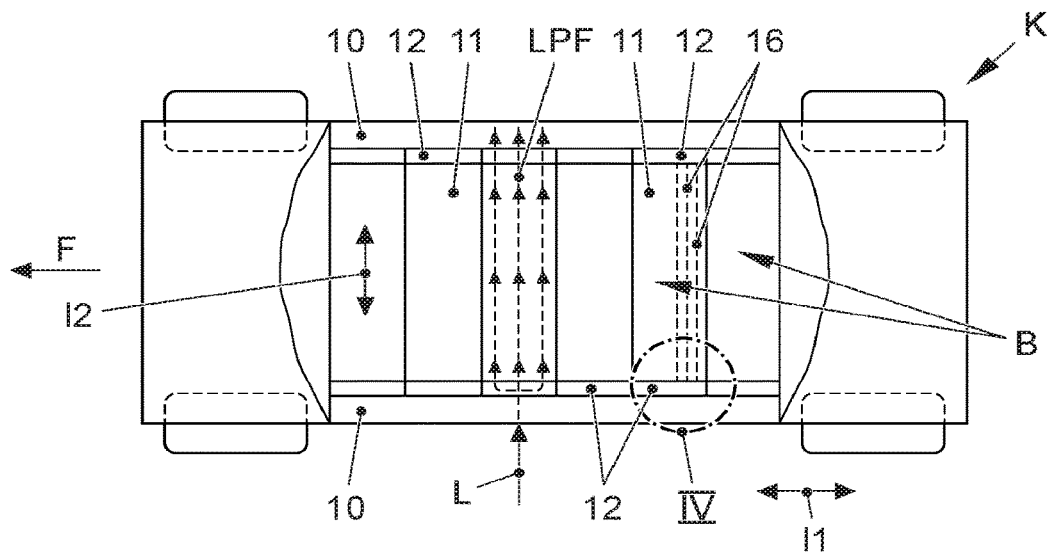
FIG. 1 shows an electrically drivable motor vehicle having a mounting arrangement according to the invention.

FIG. 1 illustrates an electrically drivable motor vehicle K, in particular an electric vehicle. The motor vehicle K is provided with a traction battery, made up of multiple battery modules B, for the drive.

Each battery module B has a battery module housing 11 in which battery cells 16 (indicated only in part) are stacked in a row. The battery cells 16 with their longitudinal direction extend in parallel to a longitudinal extension 12 of the battery module housing 11.

In addition, the battery module housings 11 with their longitudinal extension 12 are oriented transversely, in particular at a right angle, to a longitudinal extension 11 of the motor vehicle K. Six battery module housings 11 are lined up in a row in the longitudinal extension 11 of the motor vehicle K or in its customary travel direction F, between two body parts 10 in the form of rocker panels.

In addition, a load transfer element 12 is situated on each end-face side of a battery module housing 11, in particular, between its end-face side and the body part 10.

The mounting arrangement is provided in such a way that, in the event of a crash load L that occurs on a side of the motor vehicle K, a load path LPF is implemented which, starting from the body part 10 facing the crash, encompasses the load transfer element 12 facing the crash, the battery module housing 11, then the load transfer element 12 facing away from the crash, and lastly, the body part 10 facing away from the crash.

As a result of the load path LPF made possible in this way, very good collision protection for the battery modules B may be achieved, so that a battery housing having separate inner load structures (webs, for example) and spanning all battery modules B is no longer absolutely necessary.

Figure 2:
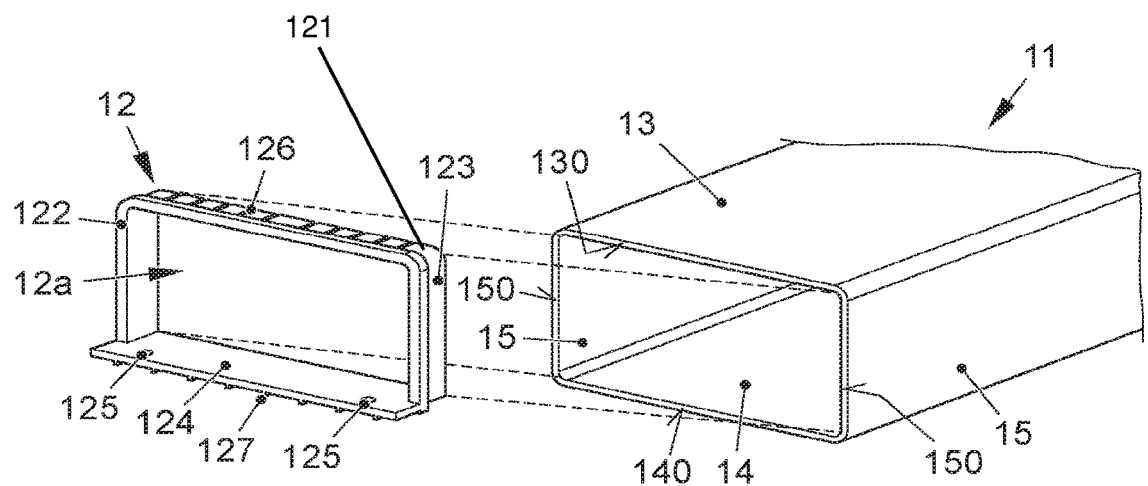
FIG. 2 shows a perspective illustration of a battery module housing and a load transfer element that is fastenable on the end-face side.
Figure 3A:
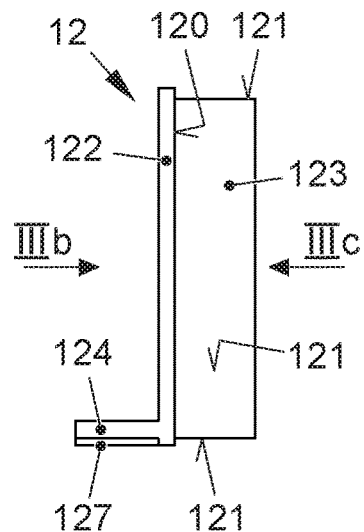
FIGS. 3a-3h show the load transfer element in various views, in a first embodiment.
Figure 3B:
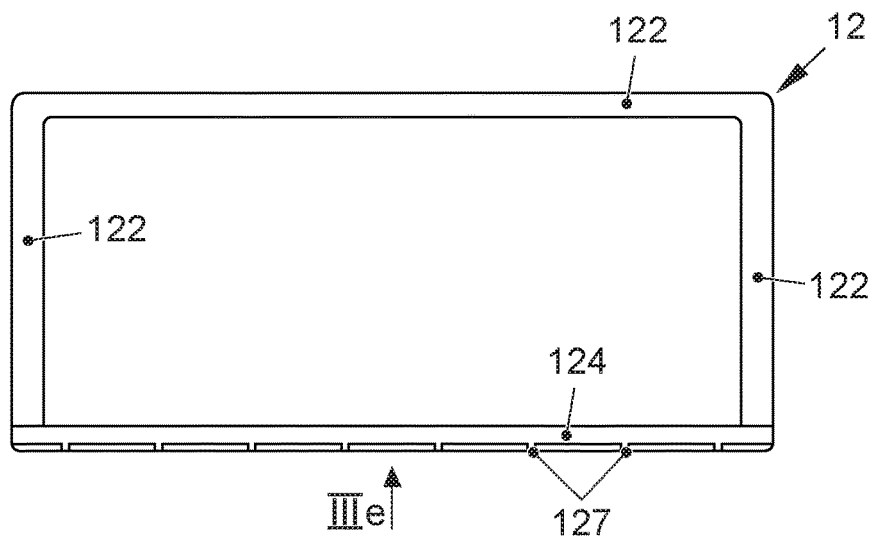
Figure 3C:
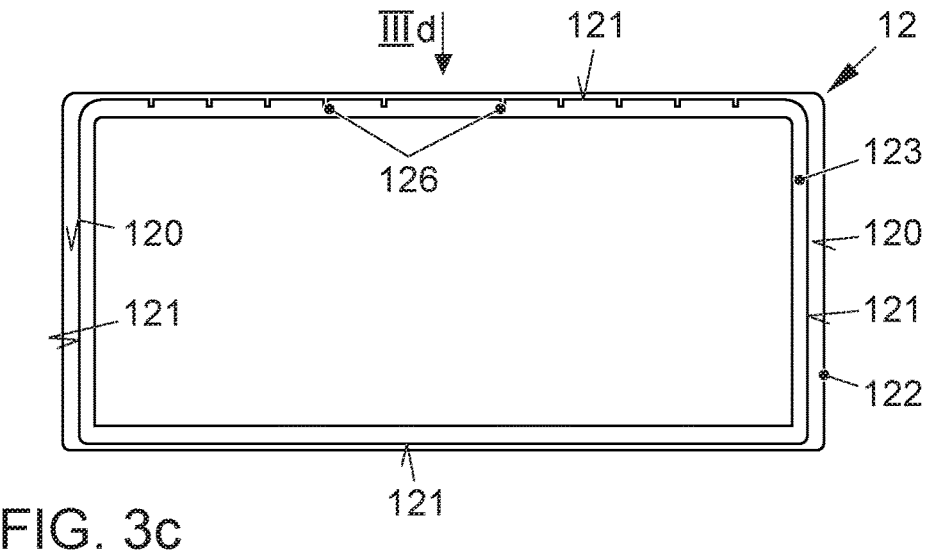
Figure 3D:
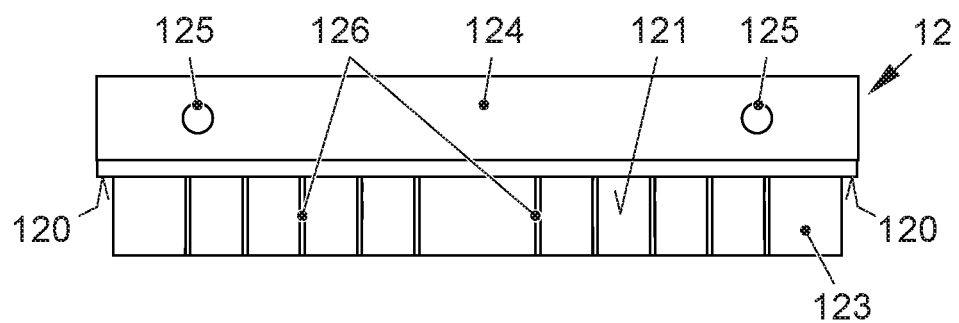
Figure 3E:
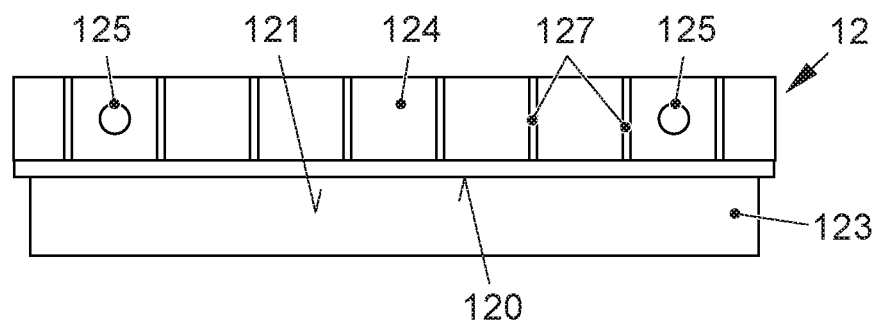
Figure 3F:
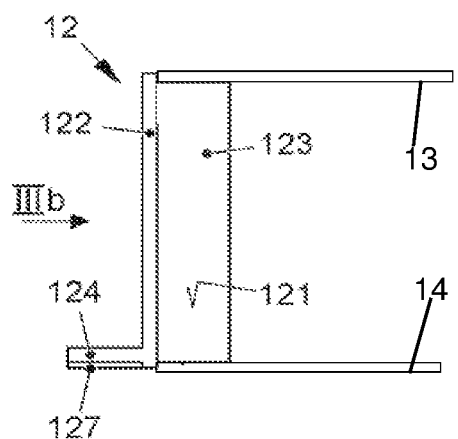
Figure 3G:
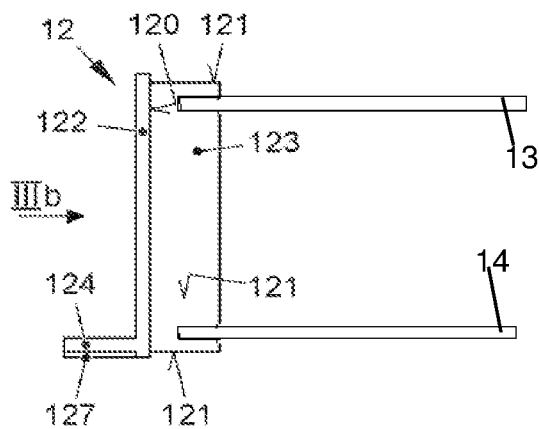
Figure 3H:
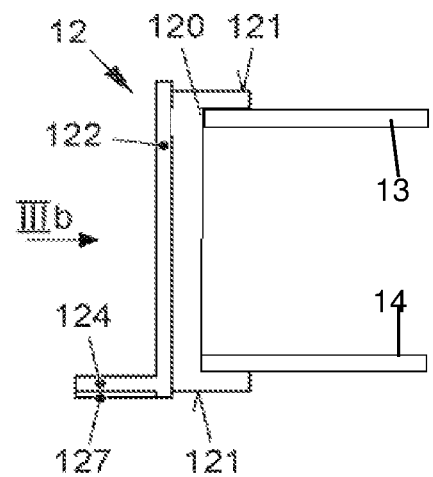

FIG. 2 illustrates an end-face end of an empty battery module housing 11 to which the load transfer element 12 is connectable.

The battery module housing 11 has a contour or cross section with a quadrilateral, in particular rectangular, shape. The battery module housing has an upper wall 13, a lower wall 14, and two side walls 15.

The side walls 15 form end-face surfaces 150, the upper wall 13 forms an end-face surface 130, and the lower wall 14 forms an end-face surface 140.

It is apparent that in the present embodiment the load transfer element 12 likewise has a quadrilateral, in particular rectangular, contour. In addition, the load transfer element 12 has a frame-like design, so that an opening 12a is formed.

As indicated by dashed lines, the load transfer element 12 may be accommodated in the battery module housing 11 on the end-face side and adjusted therein.

With reference also to FIG. 3, this takes place in such a way that the load transfer element 12 with a circumferential end-face surface 120 rests against the end-face surfaces 130 through 150 of the battery module housing 11, and is supported against these surfaces. In addition, the load transfer element 12 is designed in such a way that with a circumferential, outer side surface 121 of a circumferential shoulder 123 it rests against the walls 13 through 15 of the battery module housing 11 on the inside. The load transfer element is thus securely guided and fixed in the battery module housing 11.

In a departure from the exemplary embodiment, alternatively or additionally it is conceivable for the load transfer element 12 to protrude beyond the walls 13 through 15 of the battery module housing 11 on the outside.

The load transfer element 12 has a frame-like base part 122 from which the circumferential shoulder 123 extends at a right angle. The above-mentioned surfaces 120 and 121 are formed in this way.

A mounting bracket 124 extends starting from the base part 122, but in the opposite direction from the circumferential shoulder 123. On its bottom side the mounting bracket 124 is provided with web-like elevations 127 that extend at uniform intervals over the bottom side of the mounting bracket 124. The mounting bracket 124 is provided with greater stability due to the web-like elevations 127.

In addition, two mounting holes 125 that are used for fastening the mounting bracket 124 to the body parts 10 are introduced into the mounting bracket 124.

The load transfer element 12 has an L-shaped cross section as a result of the frame-like base part 122 and the circumferential shoulder 123 protruding therefrom. One embodiment of the load transfer element is discussed below in which the cross section has an L shape only in areas (also see FIG. 12).

Lastly, mention is also made of grooved depressions 126 situated on a top side of the circumferential shoulder 123 in the drawing illustration. The grooved depressions 126, starting from the end-face surface 120 of the frame-like base part 122, extend at a right angle to same, over the entire side surface 121. In the mounting position of the load transfer element 12, the grooved depressions 126 facilitate the escape of gas from the battery module housing 11.

Figure 4:
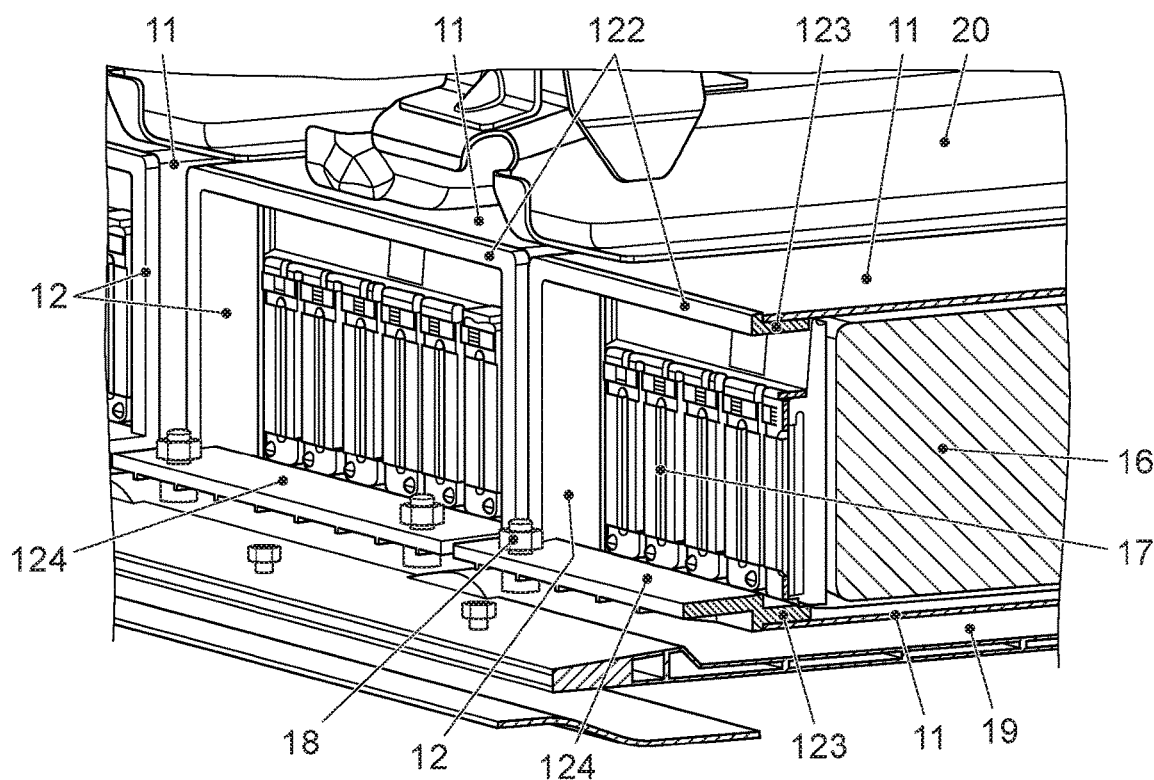
FIG. 4 shows a detail of the mounting arrangement according to detail IV from FIG. 1, without illustration of the body part connected to the load transfer element.

FIG. 4 shows a detail of multiple battery module housings 11 with accommodated battery cells 16 and with load transfer elements 12 installed, i.e., inserted on the end-face side.

Electrical terminals (poles) of the battery cells 16 are denoted by reference numeral 17. The mounting brackets 124 of the load transfer elements 12 may be fastened to a body part 10 (not illustrated here; see FIG. 5), designed as a rocker panel, via screw connections 18.

It is clearly apparent from this figure how the frame-like base part 122 is supported in each case on the battery module housing 11 on the end-face side, and is fixed or guided from the inside via the circumferential shoulder 123 in the battery module housing 11.

Figure 5:
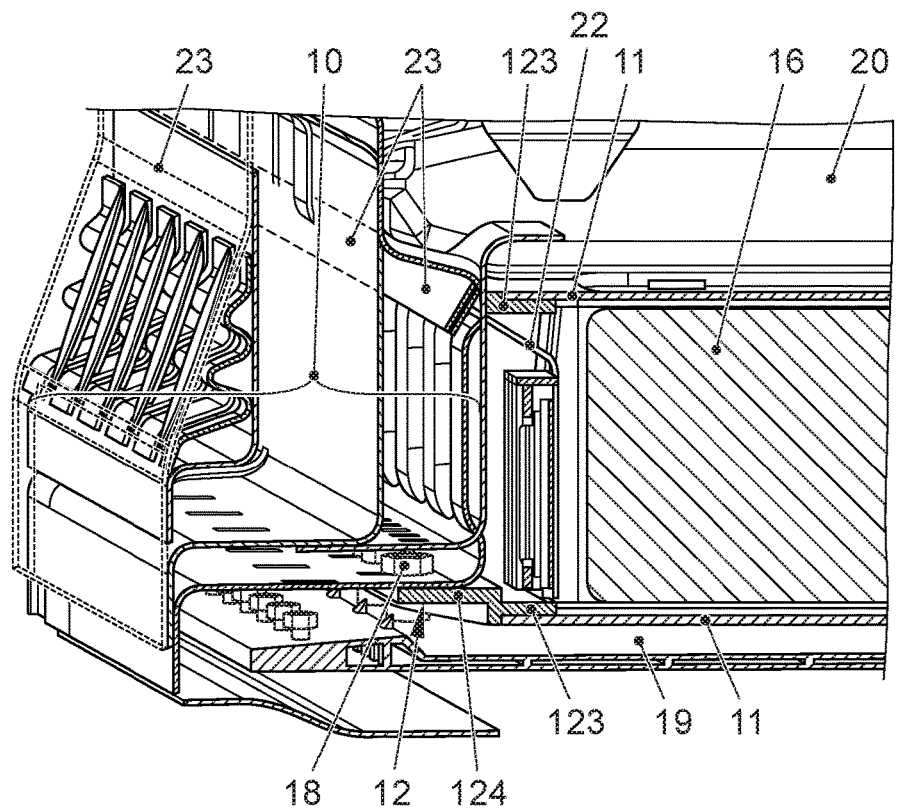
FIG. 5 shows an illustration comparable to FIG. 4, but with illustration of the body part fastened to the load transfer element.

The body part 10 is also apparent in FIG. 5. The body part 10 is designed as a rocker panel, and is made up of a component composite, not denoted by a reference numeral.

It is apparent that the body part 10, i.e., the rocker panel designed as a composite component, is fastened with one of its components to the mounting bracket 124 via the screw connections 18.

A body-side base plate which covers the battery module housings 11 from below is denoted by reference numeral 19 in FIGS. 4 and 5. Body-side crossbeams that extend over the battery module housings 11 are denoted by reference numeral 20.

It is clearly apparent from FIGS. 4 and 5 that the frame-like design of the load transfer element 12 facilitates end-face access to the battery cells 16 and the terminals 17. In addition, heat that arises in the battery cells 16 may be dissipated via heat-conducting elements 22 and discharged to a coolant line 23. The coolant line 23 extends on the end-face side along all installed battery module housings 11.

Figure 6:
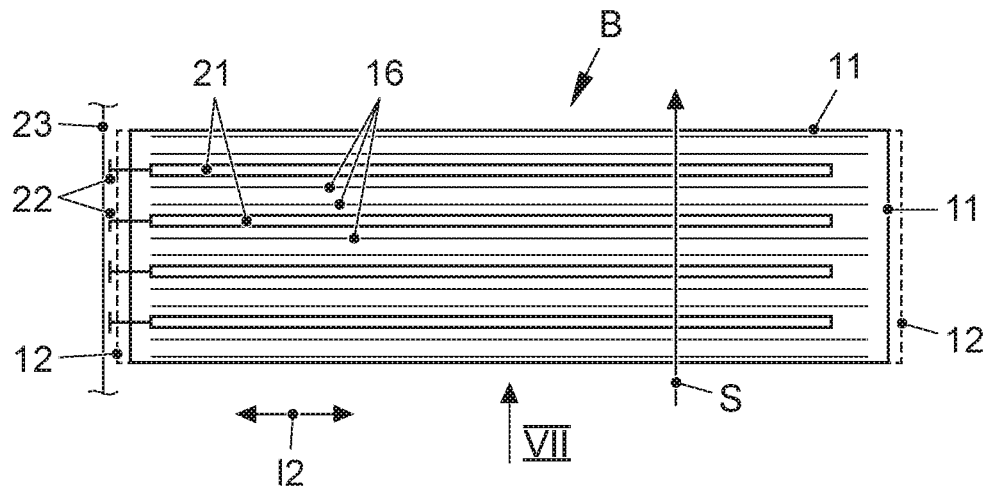
FIG. 6 shows the illustration of a battery module in a longitudinal section.
Figure 7:
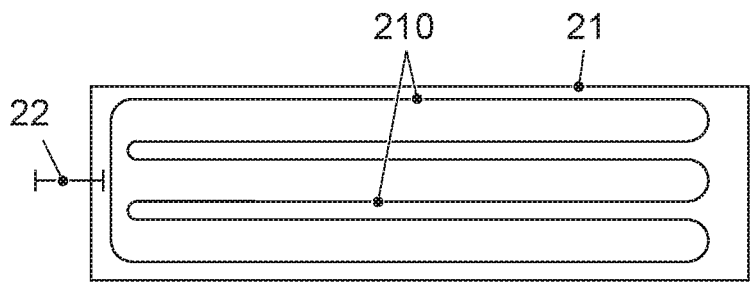
FIG. 7 shows the illustration of a plate-like component, situated in the battery module, for heat transfer, from a view VII according to FIG. 6.

The manner in which generated heat is dissipated from a battery module B is described with reference to FIGS. 6 and 7. In this regard, only the important components are illustrated in the interior of the battery module housing 11.

It is apparent that the battery cells 16 extend in the longitudinal extension l2 of the battery module housing 11, and with approximately the same length as the battery module housing 11. The battery modules 16 are thus stacked in a stacking direction S transverse to the longitudinal extension l2. However, some other design and configuration of battery cells in the battery module housing 11 is also conceivable.

Plate-like components 21, oriented in parallel to the battery cells 16 and thus integrated into the stack that is formed, are introduced at uniform intervals between the battery cells 16.

Each of the plate-like components 21 is equipped with a heat transfer element 210 that extends in a meandering manner over the surface of the plate-like component 21.

The heat transfer element 210 is designed in particular in the manner of a heat pipe. The heat transfer element thus forms a self-contained heat transfer system in which an evaporation area is present on the right side in the figure, and a condensation area is present on the left side, facing the heat-conducting element 22. In the condensation area the heat is released to the heat-conducting element 22, and from the heat-conducting element 22 is transferred to the coolant line 23 as described above. Very space-saving, effective dissipation of the heat from the battery modules B is possible via the plate-like components 21 together with the heat transfer elements 210.

Figure 8:
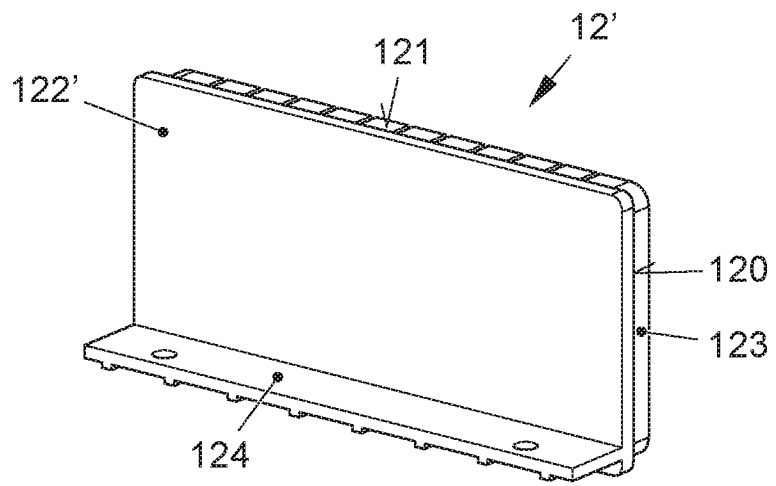
FIG. 8 shows the perspective illustration of the load transfer element in a second embodiment.

Although the load transfer element 12 according to FIG. 3 provides the advantage of better end-face accessibility to the battery modules B, according to FIG. 8 a load transfer element 12' is also conceivable which, unlike the load transfer element 12, has a plate-like base part 122'.

Figure 9:
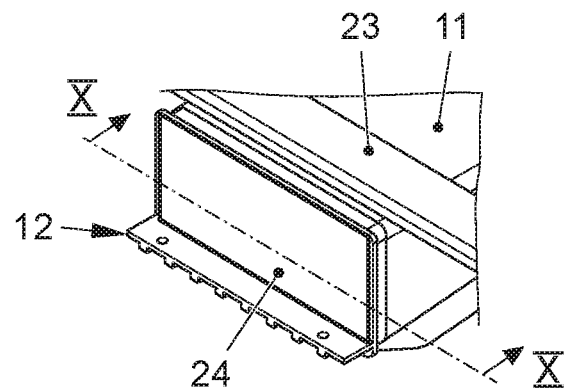
FIG. 9 shows the illustration of the load transfer element from FIG. 3, together with an additional seal element.
Figure 10:
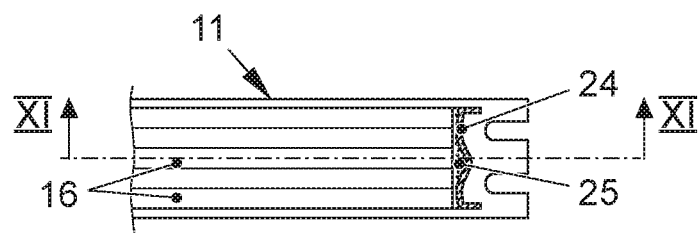
FIG. 10 shows a longitudinal section according to cut line X from FIG. 9, with the battery module housing additionally rotated.
Figure 11:
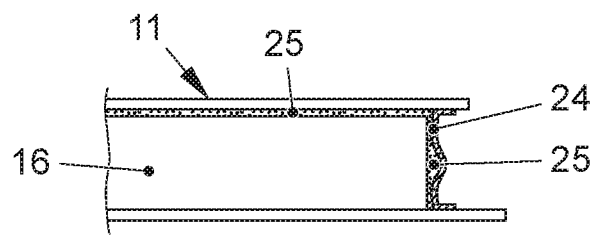
FIG. 11 shows a longitudinal section according to cut line XI from FIG. 10.

FIGS. 9 through 11 illustrate that the load transfer element 12 may be additionally closed with a seal element 24. The seal element 24 may be made of plastic, for example. The seal element may be used to seal off the end face of the battery module housing 11 against escape of a thermally conductive medium 25 that is possibly used.

Figure 12:
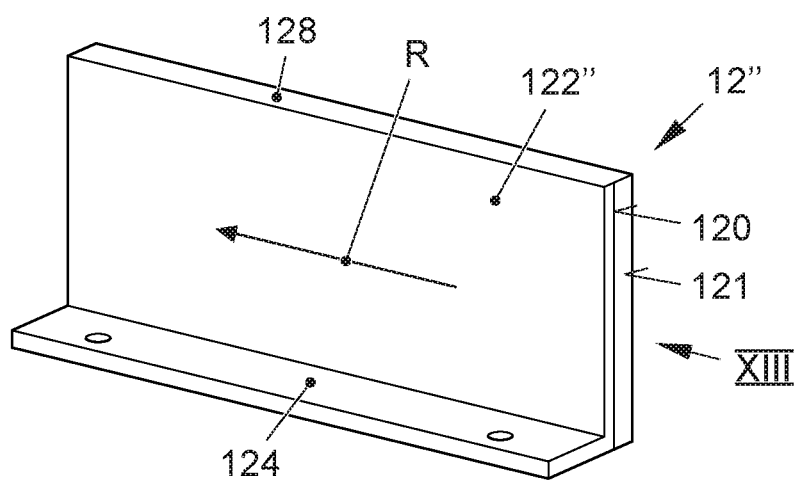
FIG. 12 shows the illustration of the load transfer element in a third embodiment.
Figure 13:
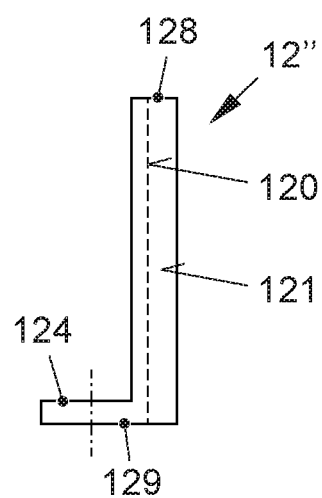
FIG. 13 shows the illustration according to view XIII from FIG. 12.

Lastly, with reference to FIGS. 12 and 13, a load transfer element 12" is described which has a simplified geometry and may thus be manufactured very efficiently, in particular in an extrusion process.

It is apparent that the load transfer element 12" likewise has a rectangular contour. However, in contrast to the preceding exemplary embodiments, the end-face surface 120 and the side surface 121 protruding therefrom are present only at the sides of the load transfer element 12". In contrast, the load transfer element 12" has a flat design on a top side 128 and on a bottom side 129. A mounting bracket 124 for fastening the load transfer element 12" is likewise present.

The load transfer element 12" may be manufactured by first producing the profile, apparent in FIG. 13, by means of the very economical extrusion process (see a possible extrusion direction R in FIG. 12), followed by cutting to the desired length, and lastly, postprocessing each cut-to-length component at the sides in such a way that the lateral shoulder and thus the surfaces 120 and 121 are created. The postprocessing may take place by milling, for example.

It is further pointed out that when the load transfer element 12" is inserted, it is supported with its end-face surface 120 only against the end-face surfaces 150 of the side walls 15 of the battery module housing 11 (also see FIG. 2). Since the walls 13 and 14 (cover and base) have a thinner design than the side walls 15, corresponding to their intended functions, stress on the walls 13 and 14 in the event of a crash load may be avoided.

As mentioned above, the battery module housing 11 is preferably made of a fiber composite plastic. The fibers of the fiber composite plastic are aligned in the longitudinal direction 12 of the battery module housing 11. The battery module housing 11 may thus be economically manufactured in the pultrusion process, and with the aid of the load transfer element 12, 12', or 12" can transmit forces very well in the longitudinal direction l2.

LIST OF REFERENCE NUMERALS 10 body parts; rocker panels
11 battery module housing
12, 12', 12" load transfer element
12a opening
13 upper wall
14 lower wall
15 side walls
16 battery cells
17 electrical terminals (poles)
18 screw connections
19 body-side base plate
20 body-side crossbeam
21 plate-like components
22 heat-conducting element
23 coolant line
24 seal element (plastic cap)
25 thermally conductive medium
120 end-face surface
121 side surface
122 frame-like base part
122', 122" plate-like base part
123 circumferential shoulder
124 mounting bracket
125 mounting holes
126 grooved depressions
127 web-like elevations
128 top side
129 bottom side
130 end-face surface
140 end-face surface
150 end-face surface
210 heat transfer element
B battery module
F travel direction
K electrically drivable motor vehicle
L crash load
l1 longitudinal extension of the motor vehicle
l2 longitudinal extension of the battery module housing
LPF load path
R extrusion direction
S stacking direction

The invention claimed is:

1. A mounting arrangement of an electrically drivable motor vehicle, comprising:
   at least one battery module housing that accommodates multiple battery cells to form a battery module, wherein:
      the battery module housing has a length that is greater than its width, and the length of the battery module is oriented transverse to a length of the motor vehicle,
      the battery module housing has a first end face that faces in a first direction transverse to the length of the motor vehicle and towards a first body part of the motor vehicle, and
      the battery module housing has a second end face that faces in a second direction transverse to the length of the motor vehicle, towards a second body part of the motor vehicle, and opposite to the first direction,
   a first load transfer element situated on the first end-face of the battery module housing, between a first body part of the motor vehicle and the battery module housing, wherein the first load transfer element is supported with its end-face surface solely, or at least predominantly, against the first end-face of the battery module housing, and a side surface of the first load transfer element contacts the battery module housing on the inside and/or outside, and
   a second load transfer element situated on the second end face of the battery module housing, between a second body part of the motor vehicle and the battery module housing, wherein the second load transfer element is supported with its end-face surface solely, or at least predominantly, against the second end-face of the battery module housing, and a side surface of the second load transfer element contacts the battery module housing on the inside and/or outside,
   wherein the first end-face and the second end-face of the battery module housing are end-face surfaces of side walls of the battery module housing,
   wherein the first load transfer element, the battery module housing, and the second load transfer element are connected in such a way that, when:

a crash load is introduced into the first body part, a first load path in the second direction is formed that encompasses at least the first body part, the first load transfer element, the battery module housing, the second load transfer element, and the second body part, and a crash load is introduced into the second body part, a second load path in the first direction is formed that encompasses at least the second body part, the second load transfer element, the battery module housing, the first load transfer element, and the first body part.

2. The mounting arrangement according to claim 1, wherein the first load transfer element is supported, at least in areas, against the first end-face of the battery module housing and fastened to the first body part; and the second load transfer element is supported, at least in areas, against the second end-face of the battery module housing and fastened to the second body part.

3. The mounting arrangement according to claim 1, wherein the first and second body parts are rocker panels.

4. The mounting arrangement according to claim 1, wherein the first and second load transfer elements each have a quadrilateral contour.

5. The mounting arrangement according to claim 4, wherein each of the first load transfer element and the second load transfer element has a frame-like contour.

6. The mounting arrangement according to claim 1, further comprising at least one plate-like component located on the first or second end-face of the battery module housing, wherein the at least one plate-like component has a heat transfer element situated between the battery cells, and the plate-like component is connected to a coolant line via a heat-conducting connection.

7. The mounting arrangement according to claim 1, wherein the battery module housing is made of a fiber composite plastic.

8. The mounting arrangement according to claim 1, further comprising at least one plate-like component having a heat transfer element situated between the battery cells in a stacking direction of the battery cells in the battery module housing.

9. The mounting arrangement according to claim 8, wherein the heat transfer element extends in a meandering manner over the surface of the plate-like component.

10. The mounting arrangement according to claim 8, wherein the heat transfer element is designed in the manner of a heat pipe.

11. The mounting arrangement according to claim 1, wherein the first load transfer element has a quadrilateral contour with an L-shaped cross section, at least in areas, by means of which an end-face surface of the first load transfer element and a side surface of the first load transfer element protruding therefrom at a right angle are formed; and wherein the second load transfer element has a quadrilateral contour with an L-shaped cross section, at least in areas, by means of which an end-face surface of the second load transfer element and a side surface of the second load transfer element protruding therefrom at a right angle are formed.

12. The mounting arrangement according to claim 11, wherein the first load transfer element has a frame-like contour, and the second load transfer element has a frame-like contour.

13. The mounting arrangement according to claim 11, wherein a first set of multiple grooved depressions are introduced, at least in areas, into the side surface of the first load transfer element, wherein, starting from the end-face surface of the first load transfer element, the first set of multiple grooved depressions extend at a right angle thereto, across the side surface of the first load transfer element; and wherein a second set of multiple grooved depressions are introduced, at least in areas, into the side surface of the second load transfer element, wherein, starting from the end-face surface of the second load transfer element, the second set of multiple grooved depressions extend at a right angle thereto, across the side surface of the second load transfer element.

14. A mounting arrangement of an electrically drivable motor vehicle, comprising:

at least one battery module housing that accommodates multiple battery cells to form a battery module, wherein:

the battery module housing has a length that is greater than its width, and the length of the battery module is oriented transverse to a length of the motor vehicle, the battery module housing has a first end-face that faces in a first direction transverse to the length of the motor vehicle and towards a first body part of the motor vehicle, and the battery module housing has a second end face that faces in a second direction transverse to the length of the motor vehicle, towards a second body part of the motor vehicle, and opposite to the first direction, a first load transfer element having a first frame shaped base, a first circumferential shoulder extending at a right angle from the first frame shaped base, and a first mounting bracket extending from the first frame shaped base in an opposite direction from the first circumferential shoulder, wherein:

a circumferential end-surface of the first frame shaped base is supported, at least in areas, against the first end-face of the battery module housing, between a first body part of the motor vehicle and the battery module housing, and the first circumferential shoulder of the first load transfer element is situated inside the battery module housing and supported circumferentially against an inside surface of walls of the battery module housing, and a second load transfer element having a second frame shaped base, a second circumferential shoulder extending at a right angle from the second frame shaped base, and a second mounting bracket extending from the second frame shaped base in an opposite direction from the second circumferential shoulder, wherein:

a circumferential end-surface of the second frame shaped base is supported, at least in areas, against the second end face of the battery module housing, between a second body part of the motor vehicle and the battery module housing, and the second circumferential shoulder of the second load transfer element is situated inside the battery module housing, and supported circumferentially against the inside surface of the walls of the battery module housing, wherein the first load transfer element, the battery module housing, and the second load transfer element are connected in such a way that, when:

a crash load is introduced into the first body part, a first load path in the second direction is formed that encompasses at least the first body part, the first load transfer element, the battery module housing, the second load transfer element, and the second body part, and a crash load is introduced into the second body part, a second load path in the first direction is formed that encompasses at least the second body part, the second load transfer element, the battery module housing, the first load transfer element, and the first body part.

\* \* \* \* \*